United States Patent [19]

Grahame

[11] 4,348,713

[45] Sep. 7, 1982

[54] IMPREGNANTS FOR METALLIZED PAPER ELECTRODE CAPACITORS

[75] Inventor: Frederick Grahame, Glens Falls, N.Y.

[73] Assignee: General Electric Company, Hudson Falls, N.Y.

[21] Appl. No.: 147,031

[22] Filed: May 6, 1980

[51] Int. Cl.³ .............................................. H01G 4/22
[52] U.S. Cl. ..................................... 361/315; 361/314
[58] Field of Search ................................ 361/315, 314

[56] References Cited

U.S. PATENT DOCUMENTS

| | | | |
|---|---|---|---|
| 1,891,080 | 12/1932 | Danzinger | 361/314 |
| 3,068,434 | 12/1962 | Ball | 361/314 X |
| 3,555,642 | 1/1971 | Hagedorn | 361/314 X |
| 3,812,407 | 5/1974 | Nose | 361/315 |
| 3,833,978 | 9/1974 | Eustance | 361/315 X |
| 4,054,937 | 10/1977 | Mandelcorn | 361/315 X |
| 4,121,275 | 10/1978 | Ross | 361/315 X |
| 4,142,223 | 2/1979 | Shaw | 361/315 X |
| 4,190,682 | 2/1980 | Shaw | 361/315 X |
| 4,229,777 | 10/1980 | Merrill | 361/314 |

*Primary Examiner*—Richard R. Kucia
*Attorney, Agent, or Firm*—J. J. Lichiello; R. J. Mooney

[57] ABSTRACT

A double metallized paper electrode and polypropylene film dielectric capacitor is preferably impregnated with a blend of a single chemical compound fluid such as phenyl xylyl ethane or mono isopropyl biphenyl and an ester liquid for improved electrical characteristics.

8 Claims, 3 Drawing Figures

IMPREGNANTS FOR METALLIZED PAPER ELECTRODE CAPACITORS

BACKGROUND OF THE INVENTION

This invention relates to impregnants for electrical capacitors having metallized paper electrodes, and more particularly to round roll capacitors which utilize a pair of doubly metallized paper strips as electrodes and an intermediate synthetic resin strip as the dielectric.

An electrical capacitor in a simple form comprises a pair of spaced electrodes, usually aluminum foil, with a synthetic resin dielectric film therebetween. If the aluminum foil is replaced by a suitably deposited very thin aluminum coating on the film the capacitor is referred to as a metallized capacitor. A metallized capacitor is most desirable in some applications because of its inherent self-clearing characteristics, i.e., when an electrical short occurs between electrodes, the arc burns away this thin coating in an enlarging area until the arc extinguishes. A typical capacitor of this kind is found in U.S. Pat. No. 3,987,348.

A recent and improved metallized capacitor uses as the electrodes a strip of paper having both sides covered by a thin metal coating and separated by a synthetic resin strip. In this arrangement the electrodes and the resin strips are rolled in convolute form, inserted in a suitable casing impregnated with a dielectric fluid. A typical tightly wound, round, metallized capacitor of this kind utilizing a liquid impregnant is found in U.S. Pat. No. 3,555,642.

A significant problem with the latter described capacitor relates to the need to improve certain characteristics such as corona start voltage, and capacitance loss with time. These problems may be influenced by the use of different fluids. However, the fluid/dielectric swelling ratio of the synthetic resin film in this kind of capacitor is most critical and seriously limits the changes brought about by the use of different fluids with different dielectric constants, viscosities, and other characteristics, or mollifies them.

One of the predominant capacitors of the type described utilizes a low dielectric constant fluid as the optimum fluid for this kind of capacitor. U.S. Pat. No. 3,555,642, Hagedorn, discloses an example of the kind of capacitor referred to and as one criterion indicates the relationship between the swelling of the film dielectric and the fluid penetration to be extremely important and that swelling of the film should be carefully correlated to the impregnating fluid and the space factor in the roll.

In contradistinction to the above combination, it has been discovered that such a capacitor can be dramatically improved by special blends of lower and higher dielectric constant fluids which in fact are blends of higher and lower swelling fluids. Also these blends are combinations of specified esters and selected hydrocarbons.

SUMMARY OF THE INVENTION

Certain blends or combinations of dielectric fluids taken from the ester and hydrocarbon classes of fluid impregnant markedly improve the impregnation and electrical performance of metallized capacitors. The fluids comprise for the purpose of this invention single chemical compound fluids such as aromatic branched chain phthalate esters and synthetic aromatic hydrocarbons, as distinguished from mineral oils for example, which comprise multiple chemical compounds. The impregnation processes are fluid related and controlled temperature processes.

DESCRIPTION OF PREFERRED EMBODIMENTS

Figure 1:
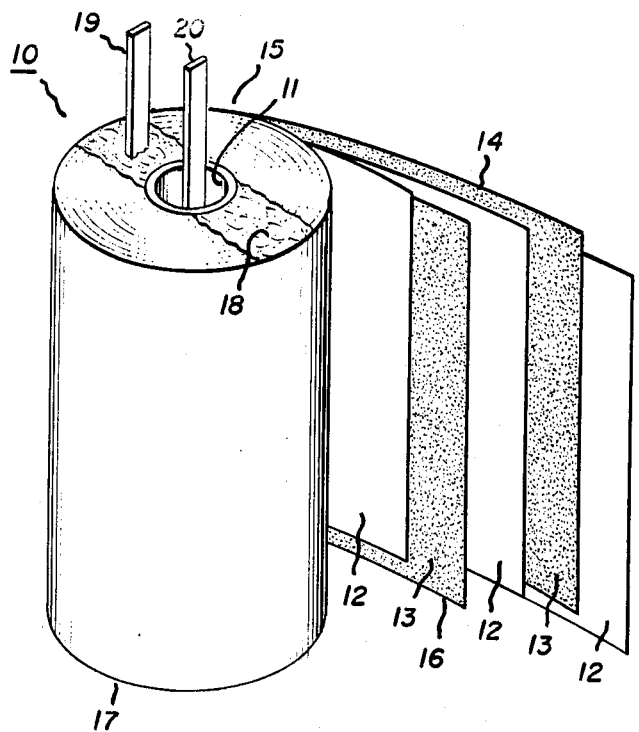
FIG. 1 illustrates a capacitor roll section of this invention in partly unrolled form.

Referring now to FIG. 1 the exemplary capacitor roll section 10 comprises a core member 11 on which is a tightly wound series of synthetic resin strips 12 and metallized paper electrodes 13. The roll section 10 is wound with the electrodes in offset relationship to each other so that the metallized edges 14 of one electrode are exposed at one end 15 of the rolls section and the exposed edges 16 of the other metallized electrode are exposed at the other end 17 of the roll section. A suitable metal such as aluminum or zinc is sprayed at each end of the roll section to form a coating 18 and electrode leads 19 and 20 are joined to coating 18.

Figure 2:
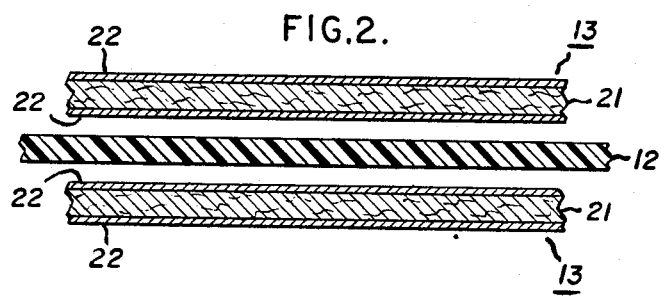
FIG. 2 is a cross-sectional view of spaced metallized paper strips and an intermediate synthetic resin strip which are wound into the roll form of FIG. 1.

As illustrated more clearly in FIG. 2 the metallized paper electrodes 13 comprise a thin, high density paper strip 21 on which is a layer or coating 22 of aluminum. A number of materials may be employed for paper 13 including woven and nonwoven polymeric materials or other porous and wicking materials which will permit the ingress of dielectric fluids therein and therealong. However, in the practice of this invention, capacitor tissue is preferred which is about 1.0 density. Such tissue is commercially available as Kraft capacitor tissue.

The paper strips 21 are coated with a metal layer 22 on both sides thereof, a combination referred to as doubly metallized paper. Preferably the metal is aluminum which is vacuum deposited on the paper by well-known vacuum deposition to provide a uniform high purity metal layer. Such layers are measured in terms of their ohms resistance per square centimeter of electrode foil and a range for the present invention is from about 4.0 to about 7.0 ohms/cm$^2$.

The synthetic resin strips 12 may be single or multiple strips of one or more of the more common dielectric resins such as the polyolefins, polycarbonates and polyamines, etc., and homo polymers and copolymers thereof. However, a resin comprising electrical capacitor grade polypropylene is a preferred resin strip for this invention. Capacitor grade polypropylene film is a higher purity, smoother polypropylene film of enhanced dielectric characteristics.

Figure 3:
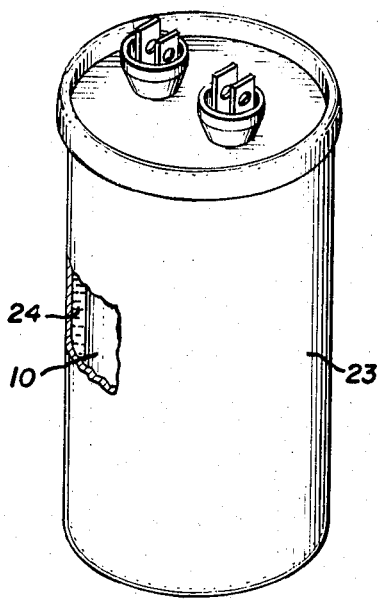
FIG. 3 illustrates the roll section of FIG. 1 inserted in a round can or casing.

The polypropylene strips 12 and metallized paper strips 13 are wound together in roll form as illustrated in FIG. 1, inserted in the round can 23 of FIG. 3, subjected to an elevated temperature vacuum drying process to remove moisture, and vacuum impregnated with a suitable dielectric fluid 24.

Heretofore it was believed that capacitors of this construction should be wound so tightly that there was little, if any, space between the film and foil surfaces, and in the event of any resulting space from winding problems, the impregnating fluid would swell the resin so that the resin would fill up these spaces. The capacitor therefore required complete liquid impregnation. However, the traditional wicking action of the paper for the fluid is severely diminished by the double metallized layer on the paper, which in combination with the swelling polypropylene film acts somewhat like a gasket seal to prevent fluid from penetrating the roll ends. Consequently, the liquid resin dielectric swelling characteristics were critical for this capacitor.

The dielectric fluid usually chosen for capacitors of the kind described was mineral oil because it was believed that mineral oil, with its low dielectric constant, included some desirable viscosity, corona, and thin film stability characteristics. The use of mineral oil appears to be correlated to the round roll, round can design and the tightness of the roll winding, and because of these factors a somewhat longer impregnation process is required. Unlike the oval can roll and capacitor, where both the flat part of the roll and the curved ends are relatively loose and readily receptive to impregnating fluids, the tightly wound roll becomes very difficult to impregnate.

Mineral oil was preferred over some other commonly used liquid impregnants of other capacitors, including esters and certain hydrocarbons, for a number of reasons. The esters fluids, particularly the branched chain esters, have been found to be excellent impregnants for impregnated capacitors generally. However, they provide results which are different in some kinds of capacitors than in other capacitors. The capacitor environment plays an important role in the choice of impregnant fluids. One of the major advantages of ester fluids is a higher dielectric constant, but in high voltage stressed units their major disadvantages are their relatively high viscosity and their limited ability to absorb gases. In fact they may release gas which supports corona discharge.

Certain hydrocarbon fluids such as the ethanes, alkanes and diphenyls have been noted as excellent impregnants for impregnated electrical capacitors. These fluids also seem to provide results which are different in some kinds of capacitors than in others. One of the main disadvantages of these hydrocarbon fluids is their lower dielectric constant, and they tend to form deleterious carbonaceous residues because of their weaker dielectric strength and chemical structure. These residues become undesirable electrically conductive areas in the capacitor.

In the capacitor as described, there are conditions contributing greatly to the disadvantages of each class of fluids. The structure uses a relatively gassy material, a paper, and utilizes self-clearing actions, the combination of which provides an abundance of gases which support corona discharge. At the same time the round roll is tightly wound and impedes impregnation for viscous fluids which otherwise may be more advantageous.

It has been discovered that for capacitors as described a given blend of liquid impregnant which includes certain combinations of both a low dielectric constant hydrocarbon and a higher dielectric constant ester provides a markedly improved capacitor. These blends are blends of substantial amounts of each fluid; for example, 40% to 60% by volume of each component, so that there is a significant contribution of the major advantages of each fluid as well as significant mollifying actions. One example of such a blend is 60% by volume of di-2-ethyl-hexyl phthalate (DEHP) and 40% by volume of phenyl xylyl ethane (PXE).

These fluid blends have a greater affinity for the described capacitor construction and more quickly and easily penetrate the roll and the synthetic resin to establish and maintain a fluid supply presence throughout the roll which is critical to this invention. At the same time the constituents of these fluid blends have certain affinities for each other with regard to viscosity and film swelling. With respect to viscosity, DEHP is of a higher viscosity than mineral oil, but PXE has a lower viscosity. DEHP will swell polypropylene film less than mineral oil and less than PXE. However, the ester should be the predominant fluid and comprise at least 50% of the mixture in order to gain full advantage of the higher dielectric constant and proven general performance in capacitors. The lower dielectric constant hydrocarbon fluids are more compensating fluids in that they penetrate polypropylene film more easily than mineral oil, yet their excellent penetration ability compensates for the higher viscosity of the ester fluid, within limits. The significant advantage of these blends is their clearing performance in the capacitor operation.

Phenyl xylyl ethane is a commercially available fluid having the general formula

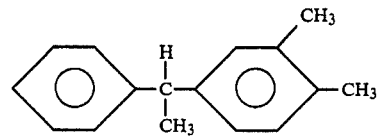

Another hydrocarbon fluid is mono isopropyl biphenyl (MIPB) which is also commercially available and has the general formula

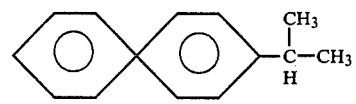

Other hydrocarbons useful in this invention include, in addition to the ethanes and biphenyls, fluids from the diaryl alkane class.

Typical branched chain esters are disclosed in U.S. Pat. No. 3,925,221, Eustance, and assigned to the same assignee as the present invention. Specific examples for the present invention are branched chain aromatic phthalate esters such as di-2-ethyl-hexyl phthalate and di-isononyl phthalate.

The improved fluids of this invention are characterized by being nearly spherical molecular single chemical compounds as opposed to multiple chemical compounds or molecular chain compounds. Excellent results have been obtained when using these fluids in tightly wound, round roll metallized paper electrode capacitors. Their uses in other kinds of capacitors have not indicated the kind of characteristics they display in the capacitor construction of this invention.

The use of the blends of this invention is not known to be as critical as for prior fluids, for example, mineral oil. The present blends cause less swelling of polypropylene and dissolve polypropylene to a lesser extent. They excell in corona suppression characteristics which means that less gas is evolved in the capacitor and chain reactions of corona—liberation of corona supporting gases—more corona—etc., is minimized. The favorable results of the use of the blends of this invention is predicated to a large extent on the round roll capacitor. The round roll is more desirable because of its inherent stability and predictable uniform physical and electrical characteristics. Furthermore, with regard to the specific capacitor as described, the use of PXE alone has distinct impregnating and electrical advantages over the use of mineral oil. This latter feature can be seen by the self-clearing action taking place in a capacitor, with a more positive and accelerating clearing action being associated with PXE.

The following example is illustrative of the unexpected results achieved through the use of this invention:

EXAMPLE 1

In this example a number of capacitors were made up in accordance with the drawings of this application. The doubly metallized paper was of 1.17 g/cm$^3$ density and was metallized with aluminum such that the surface resistivity was 4 to 6.6 ohms per square on each surface. The polypropylene film was 0.315 mil±0.008 mil thick. The vacuum drying and impregnation process was carried out in the manner known for small capacitors generally. These capacitors were impregnated with each of the three liquids for comparison:
1. PXE with epoxide stabilizer
2. 60% DEHP+40% PXE (volume %) with epoxide stabilizer
3. DEHP with epoxide stabilizer
4. Mineral oil The resulting capacitors had a rating of 17 mfd and 480 volts rms at 60 Hz with an electrical stress of 1524 volts per mil. Test results are as follows:

| Impregnant | Time to Impregnate | Capacitance Increase Due to Impregnation | Corona Level Test As Mfgrd @ 660 VAC | After 90° C. Bake 660 VAC | Breakdown Volts AC |
|---|---|---|---|---|---|
| PXE | 2.1 hrs | 21% | <15 pC | <50 pC | 1300 |
| 60% DEHP + 40% PXE | 8 hrs | 29% | <15 pC | <50 pC | 1649 |
| DEHP | 25 hrs | 34% | 130 pC | >400 pC | 1920 |
| Mineral Oil | 4.5 hrs | 17% | >200 pC | >>200 pC | 2038 |

There are certain points of interest with respect to these capacitors in Table 1 as follows:
1. The time to achieve essentially complete impregnation, defined as the time to reach 99.5% of ultimate capacitance, is important because shorter times reduce processing time and cost.
2. The capacitance increase as a result of impregnation is important because the greatest increase leads to lowest cost, other things being equal.
3. The partial discharge (corona) intensity of the capacitor as manufactured in pC (pico coulombs) should be low.
4. The effect of heating to 90° C. (as required in leak testing the enclosure) on partial discharge intensity. The less the increase and the lower the intensity, the more stable the system will be.
5. The ultimate short-term 60 Hz AC breakdown strength when the voltage is increased at a rate of 150 Vrms/second. This is a measure not only of the dielectric strength of the system but also the efficiency of the self-healing process in resisting permanent breakdown.

The high breakdown voltage and favorable capacitance increase with DEHP are offset by the long impregnation time and most particularly by a tendency to slowly release gas in service due to corona which leads to shortened service life. The favorable impregnation time and corona behavior of PXE is mitigated by its lower capacitance and most particularly by its relatively low breakdown strength where high voltage applications are involved. However, for many applications PXE becomes a favorable impregnant for ease of impregnation and complete penetration. The example mixture of 60% DEHP with 40% PXE is an impregnant which combines the essential corona characteristics of PXE with sufficiently high breakdown voltage to permit its use in a much wider range of applications than either of its constituents at favorable cost/benefit ratios. The relatively low capacitance increase and a serious tendency to slowly release gas as a result of corona are problems when the conventional mineral oil impregnant is used.

In the specific capacitor construction as described, prior manufacture required a very thin layer of low dielectric constant mineral oil in order to withstand the high stresses imposed on the oil. Mineral oil in thicker layers was subject to more rapid breakdown because of the stress-volts per mil thickness relationship. These factors imposed a severe restriction on manufacturing processes such as roll winding. DEHP, on the other hand with its high dielectric constant, could safely be used to ameliorate the winding criticality because of its higher dielectric constant and its resultant satisfactory operation in thicker layers. DEHP, in this instance, has a higher dielectric constant than may be required for these capacitors. The combination of PXE and DEHP serves a combination of dual purposes, a matching of dielectric constants to the capacitor, and a relieving of certain processing criticalities. Additional hydrocarbons of the class described include MIFB and the terphenyls as fluids to be used together with esters. Ordinarily it is preferred that each constituent be present in the fluid blend in substantial quantities as is found in the 60/40 blend. Preferred blends would include above about 25% by volume of each constituent for effectivity purposes.

The fluids of this invention may also utilize the additive stabilizers such as the epoxides, antioxidants and the hydrogen or gas absorbers as known in the art.

Other hydrocarbons which may be blended with an ester but with somewhat different results include an unsaturated aliphatic alpha olefin having from 10 to 20 carbon atoms such as tetradecene, reference being made to U.S. Pat. No. 4,142,223, assigned to the same assignee as the present invention, for a more complete description thereof.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. In an electrical capacitor comprising a pair of spaced strip electrodes and a synthetic resin film dielectric therebetween to form a laminate which is tightly wound in a roll form and placed in a casing and impregnated with a dielectric fluid, the combination comprising
   (a) the said strip electrodes comprising capacitor tissue paper having both sides metallized with a thick layer coating of aluminum,
   (b) and a dielectric fluid impregnating said roll and paper strips,
   (c) said fluid consisting essentially of a blend of about 25–50 percent by volume of an aromatic hydrocarbon selected from the group consisting of phenyl xylyl ethane, monoisopropyl biphenyl and mixtures thereof and a 50–75 percent by volume of a phthalate ester.

2. The invention as recited in claim 1 wherein said aromatic hydrocarbon is phenyl xylyl ethane.

3. The invention as recited in claim 1 wherein said aromatic hydrocarbon is methyl isopropyl biphenyl.

4. The invention of claims 1, 2 or 3 wherein said ester is taken from the class consisting of di-2-ethylhexyl phthalate and di-isononyl phthalate.

5. The invention in claim 1 wherein said synthetic resin film is polypropylene of less than 0.5 mil thick.

6. The invention in claim 4 wherein only one roll is placed in said casing, said resin is polypropylene film of less than 0.5 mil thick, and said capacitor is rated between 220 volts and 660 volts.

7. The invention as recited in claim 4 said hydrocarbon is about 50% by volume of the blend and said phthalate ester is about 50% by volume of the blend.

8. The invention as recited in claim 4, wherein said phenyl xylyl ethane is about 40 percent by volume of said blend and said di-2-ethylhexyl phthalate is about 60 percent by volume of said blend.

* * * * *